United States Patent [19]

Mastrangelo

[11] Patent Number: 5,369,544
[45] Date of Patent: Nov. 29, 1994

[54] SILICON-ON-INSULATOR CAPACITIVE SURFACE MICROMACHINED ABSOLUTE PRESSURE SENSOR

[75] Inventor: Carlos H. Mastrangelo, Ann Arbor, Mich.

[73] Assignee: Ford Motor Company, Dearborn, Mich.

[21] Appl. No.: 43,044

[22] Filed: Apr. 5, 1993

[51] Int. Cl.$^5$ ............................................. H01G 7/00
[52] U.S. Cl. ................................... 361/283.4; 73/718
[58] Field of Search .......... 361/283.1, 283.4, 328–330; 73/715, 724, 718, 716, 721; 29/25.42; 257/419, 415

[56] References Cited

U.S. PATENT DOCUMENTS

| | | | |
|---|---|---|---|
| 3,539,705 | 11/1970 | Nathanson et al. | 174/68.5 |
| 3,846,166 | 11/1974 | Saiki et al. | 117/212 |
| 4,262,399 | 4/1981 | Cady | 29/25.42 |
| 4,420,790 | 12/1983 | Golke et al. | 361/283.4 |
| 4,467,394 | 8/1984 | Grantham et al. | 361/283 |
| 4,589,054 | 5/1986 | Kuisma | 361/283 |
| 4,625,560 | 12/1986 | Sanders | 73/718 |
| 4,701,826 | 10/1987 | Mikkor | 361/283.4 |
| 4,740,410 | 4/1988 | Muller et al. | 428/133 |
| 4,744,863 | 5/1988 | Guckel et al. | 156/653 |
| 4,838,088 | 6/1989 | Murakami | 73/724 |
| 4,849,070 | 7/1989 | Bly et al. | 156/643 |
| 4,849,071 | 7/1989 | Evans et al. | 156/644 |
| 4,960,177 | 10/1990 | Holm-Kennedy et al. | 177/210 |
| 4,996,627 | 2/1991 | Zias et al. | 361/283.4 |
| 5,029,479 | 7/1991 | Bryan | 73/721 |
| 5,095,401 | 3/1992 | Zavracky et al. | 361/283.4 |
| 5,163,329 | 11/1992 | Shimaoka et al. | 73/721 |

Primary Examiner—Bruce A. Reynolds
Assistant Examiner—Gregory L. Mills
Attorney, Agent, or Firm—Richard D. Dixon; Roger L. May

[57] ABSTRACT

A method and structure for forming a capacitive transducer having a deformable single crystal diaphragm. A first well region is formed within a semiconductor substrate in an SOI wafer having a sacrificial layer of known thickness and a top single-crystal silicon layer thereon. Next, a silicon epitaxial layer is deposited on the top silicon layer for forming a flexible single crystal membrane. The epitaxial layer and the sacrificial layer are masked and etched to define the flexible diaphragm. An electrical insulating conformal support layer is deposited on the substrate and attached to the diaphragm so as to seal the sacrificial layer therebetween. An access opening is etched through the diaphragm, and then a wet etchant is inserted through the access opening for removing the sacrificial layer, thereby defining a diaphragm cavity between the remaining epitaxial layer and the substrate. The thickness of the diaphragm cavity is substantially equal to the thickness of the sacrificial layer removed from the SOI wafer. Conductive ions are diffused into facing sections of the diaphragm and the first well of the substrate so as to define fixed and deformable electrodes of the sensing capacitor. Next, a plug is selectively deposited within and for sealing the access opening without substantially reducing the volume of the diaphragm cavity. In this manner, a deflection of the flexible diaphragm in response to variations between the ambient pressure and the pressure sealed within the diaphragm cavity causes a o corresponding change in the capacitance between the first well region and the conductive region in the diaphragm. A reference capacitive sensor of similar construction is also provided for ratiometric pressure measurements. A pressure transducer manufactured in accordance with this process is also described.

16 Claims, 4 Drawing Sheets

SILICON-ON-INSULATOR CAPACITIVE SURFACE MICROMACHINED ABSOLUTE PRESSURE SENSOR

FIELD OF THE INVENTION

This invention relates generally to the field of semiconductor processing techniques, and more particularly to absolute pressure sensors having flexible single crystal diaphragms formed on a semiconductor substrate.

BACKGROUND OF THE INVENTION

Guckel et al. in U.S. Pat. No. 4,744,863 disclose the use of a sealed cavity semiconductor pressure transducer employing a flexible, polysilicon deformable diaphragm that is formed over a sacrificial oxide post on a semiconductor substrate. The sacrificial post includes a plurality of web-like appendages extending along the substrate beyond the periphery of the post. After the diaphragm material is conformally deposited upon the post, the periphery of the diaphragm material is etched away to reveal the sacrificial oxide. The sacrificial oxide is then etched away beneath the flexible diaphragm in order to define a diaphragm cavity. The holes formed in the perimeter of the diaphragm after the sacrificial oxide is etched away are then sealed in order to form the diaphragm cavity.

The preferred embodiment teaches the use of resistive and other similar passage sensors that are deposited on the flexible diaphragm. The resistance of these resistors will change in proportion to the deformation of the flexible diaphragm as the ambient pressure changes with respect to the pressure sealed within the diaphragm cavity. At column 6, in lines 47-63, mention is also made of using a structure for carrying two plates of a capacitive sensor such that the capacitance will change in response to the deflection of the diaphragm.

In contrast to the prior art, it is an object of the present invention to utilize a single crystal silicon diaphragm that is epitaxially formed on an SOI (silicon-on-insulator) substrate, where the thickness of the sacrificial oxide layer on the SOI wafer is generally equal to the thickness of the diaphragm cavity to be formed. The use of a highly controllable silicon dioxide coating on the SOI wafer yields a capacitor having a moderate operative capacitance and a minimum parasitic capacitance.

Furthermore, the use of a thin silicon film as the starting material for the construction of the diaphragm assures that the sensor will include all of the properties and advantages of a single crystal diaphragm. The mechanical properties of single crystal diaphragms are much more predictable than those of other silicon materials and structures, and therefore sensors having single crystal diaphragms can be fabricated with much tighter tolerances and performance specifications. And finally, the present fabrication process does not require the bonding of patterned structures for the diaphragm.

Further objects, features, and advantages of the invention will be apparent from references to the following detailed specification when taken in conjunction with the attached drawings.

SUMMARY OF THE INVENTION

A silicon micromachine method and structure for forming a capacitive transducer having a deformable membrane. A first well region is formed within a semiconductor substrate having a sacrificial layer of known thickness and layer of silicon thereon, such as an SOI (silicon-on-insulator) wafer. Next, a layer of silicon is epitaxially deposited on the SOI wafer for forming a single crystal membrane of increased thickness. The epitaxial layer and the sacrificial layer are masked and etched to define the flexible diaphragm on the SOI substrate. An electrical insulating conformal support layer is deposited on the substrate and firmly attached to the diaphragm layer so as to seal the sacrificial layer therebetween. A relatively small access opening is etched through the epitaxial layer, and then an etchant is inserted through the access opening for removing the sacrificial layer, thereby defining a diaphragm cavity between the epitaxial layer and the substrate. The thickness of the diaphragm cavity is substantially equal to the thickness of the sacrificial oxide on the SOI wafer. Conductive dopants next are diffused through the access opening and into the diaphragm cavity for forming a first diffused conductor in the well within the substrate and a second diffused conductor within the facing side of the flexible diaphragm. Next, a plug is selectively deposited within and for sealing the access opening without substantially reducing the volume of the diaphragm cavity. In this manner, a deflection of the flexible diaphragm in response to variations between the ambient pressure and the pressure sealed within the diaphragm cavity causes a corresponding change in the capacitance between the first and second diffused conductors forming the capacitive sensor.

DESCRIPTION OF THE PREFERRED EMBODIMENTS

The present invention relates to a capacitive surface micromachined sensor suitable for the measurement of absolute gas pressure. The structure consists of a single crystal silicon-on-insulator diaphragm suspended approximately 0.2 $\mu$m above a silicon substrate. The design for a barometric pressure sensor has a pressure range of 14 PSI, a nominal capacitance of 1.1 Pf with a full scale span of 0.26 Pf. Each device, including a matched reference capacitor, occupies only 0.17 mm$^2$ area.

Figure 1:
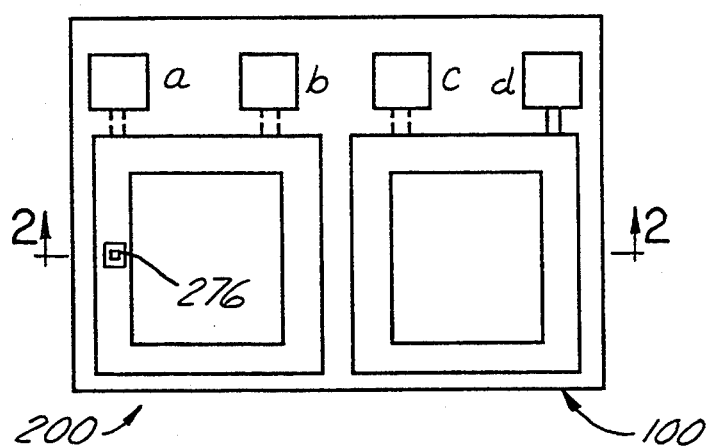
FIG. 1 illustrates a top view of the preferred embodiment including the pads for coupling the electrical signals from the sensors.
Figure 2:
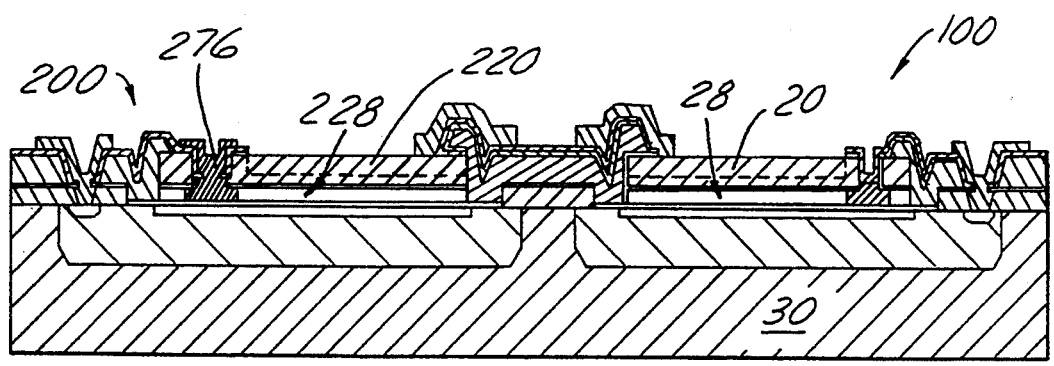
FIG. 2 illustrates a frontal cross-section view of a capacitive sensor and a reference sensor taken along section lines 2—2 in FIG. 1.
Figure 3:
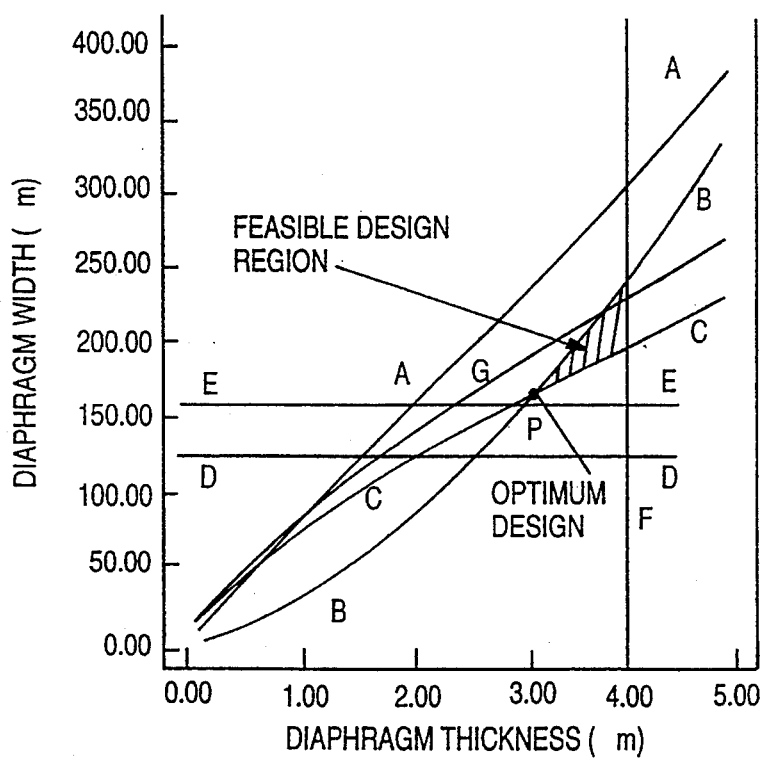
FIG. 3 is a graphical illustration of the design constraints considered in optimizing the sensor in accordance with the present invention.

The basic design of the absolute pressure transducer is the two plate capacitor 100 shown in FIGS. 1 and 2. The top plate of the capacitor is a flexible diaphragm 20 made of the top silicon film on a silicon-on-insulator (SOI) wafer, and the stationary electrode 30 is the substrate. The top electrode forms a hermetically sealed cavity 28 at a fixed pressure. The pressure difference between the inner cavity 28 and the exterior of the sensor deflects the top electrode. This transducer does not use the area necessary for the propagation of the (111) planes as with most bulk silicon micromachined pressure sensors. As a result, its area is extremely small. An unsealed matched reference capacitor 200 is included for ratiometric measurements, and includes a permeable polyimide seal 276.

The diaphragm material selected is single crystal silicon (having a 100 crystal lattice orientation) resting on a thin layer of silicon dioxide which serves as a sacrificial layer. This material can be formed by several techniques including bonding and ion implantation of a buried oxide layer.

In the preferred embodiment, a blank SOI wafer with the oxide layer thickness equal to the electrode spacing is used as the starting material. The remainder of the stationary transducer elements are built with deposited thin films. This design exploits the well-known mechanical properties of a single crystal material as well as the topological versatility of surface micromachining to construct a small single crystal diaphragm pressure sensor. Older designs that included single crystal diaphragms could only be fabricated by bulk micromachining and wafer bonding yielding larger structures.

The electrode gap is on the order of a few hundred nanometers which allows for a device capacitance in the order of 1–2 Pf. This capacitance is large enough to be sensed with off chip circuits connected through four bonding pads a, b, c, and d. These devices can be manufactured to meet a $\pm 10\%$ error specification in the sensed capacitance to pressure characteristic without any calibration. This feature reduces the sensor cost significantly.

Design Example

In an air intake manifold pressure sensor (MAP) application that measures air pressure between 0–$10^5$ Pa (0–14 PSI), there are three design variables: the diaphragm width w, its thickness t, and the electrode spacing d. The sensor must meet several design criteria: a) the capacitance of the sensor must be above a minimum $C_{min}$; b) the device must have a full pressure range of $P_r$, and it must be able to withstand the overpressure $P_{ov}$; c) the pull-in voltage of the diaphragm must be greater than $V_{pmin}$; and d) the variability of the load deflection curve subject to process variations must be below threshold $e_o$. Furthermore, the area and cost must be minimized in order to reduce costs.

The sensor design problem may be treated as an optimization problem with equality and nonequality constraints. Ignoring the diaphragm residual stress, the equation that determines its center load deflection curve is given by $$z_m \approx \frac{\alpha w^4 P}{D}, \quad (1)$$

$$D = \frac{Et^3}{12(1-v^2)}$$

The electrode gap is designed with the criteria that $d = z_m (P_r)$.

$$d = \frac{\alpha w^4 P_r}{D} \quad (2)$$

The rupture condition for this diaphragm is independent of its width w. Instead, the diaphragm ruptures when its maximum stress is equal to the fracture stress, and its deflection is equal to d. To prevent the plate fracture, the condition $$\left(\frac{w}{t}\right) \leq \sqrt{\frac{\sigma_f}{\beta P_{ov}}} \quad (3)$$

must be satisfied. Using Equations (2) and (3) and using $P_r = P_{ov}$, w is eliminated obtaining:

$$d \leq \left(\frac{12\alpha(1-v^2)\sigma_f^2}{\beta^2 P_{ov} E}\right) t \quad (4)$$

which coupled with Equations (2) yields $$\left(\frac{w}{t}\right) \leq \left(\frac{\sigma_f^2}{\beta^2 P_r P_{ov}}\right)^{\frac{1}{4}} \quad (5)$$

The capacitance of the sensor is $$C = \frac{\epsilon_o w^2}{d} \geq C_{min} \quad (6)$$

which coupled with Equation (2) yield the constraint $$w = \sqrt{\frac{\epsilon E t^3}{12\alpha C_{min} P_r (1-v^2)}} \quad (7)$$

In this design, the deflecting diaphragm is the top electrode; hence the pull-in voltage is dependent on its thickness $$V_p \approx \frac{64}{7} \sqrt{\frac{E t^3 d^3}{5(1-v^2) w^4 \epsilon_o}} \geq V_{pmin} \quad (8)$$

when this result is coupled with Equation (2), the new constraint yields $$w = \frac{(5\epsilon_o)^{\frac{1}{8}} (7 V_{pmin} E)^{\frac{1}{4}}}{(64)^{\frac{1}{4}} (1728\alpha^3 P_r^3)^{\frac{1}{8}}} t^{\frac{3}{8}} \quad (9)$$

Using Equations (17–20) (see below), the total relative error of the maximum deflection is $$\epsilon_{2m} \approx \left(16\left(\frac{\Delta w}{w}\right)^2 + 9\left(\frac{\Delta t}{t}\right)^2 + \left(\frac{\Delta d}{d}\right)^2 + \left(\frac{\Delta E}{E}\right)^2\right)^{\frac{1}{2}} \leq \epsilon_o \quad (10)$$

Under modern silicon processing, the Young's modulus of SOI silicon may be controlled within 1%. Note that for deposited films $\Delta t/t$ and $\Delta d/d$ are constant. The width variation $\Delta w \approx 1–2$ $\mu$m is fixed and limited by the lithographic process. Thus, Equation (10) is equivalent to setting a minimum width limit. An additional constraint is in the maximum thickness of the diaphragm. For most practical purposes, t is $\leq 4$ mm thick. A limit in the minimum electrode gap distance of 200 nm results in the constraint:

$$w = \sqrt{\frac{C_{min} d_{min}}{\epsilon_o}} \quad (11)$$

The area of the primary sensor device plus a corresponding reference capacitor is $$A_c \approx (w + 3r + c + p)(2w + 3r + c) \quad (12)$$

where r is the outer rim of the chip, and p is the width of the bonding pad ($\cong 100$ μm). In this design, the interelectrode-gap is limited by the maximum buried oxide achievable. Current limits for ion implanted SOI films are near $d_{max} = 0.4$ μm. This constraint coupled with Equation (2) yield the additional equation $$w \geq \left( \frac{d_{max} E}{12\alpha(1-\nu^2) P_r} \right)^{\frac{1}{4}} t^{\frac{3}{4}} \quad (13)$$

For the most practical purposes, the minimum width is determined by the $C_{min}$ constraint and the pull-in constraint. Setting Equations (7) and (9) equal results in $$w \propto \sqrt{\frac{C_{min} V_{pmin}}{P_r}} \quad (14)$$

Thus, the diaphragm width is proportional to the geometric mean of $C_{min}$ and $V_{pmin}$ constraints. Hence, Equation (14) requires that w must increase if either $C_{min}$ or $V_{pmin}$ increases.

The design optimization of an SOI absolute pressure sensor is shown graphically in FIG. 2. Curve A shows the rupture constraint with $P_{max} = 600$ MPa. Curves B and C show the $C_{min}$ and $V_{pmin}$ constraints Curve D shows the deflection error constraint, and Curve E shows the $d_{min}$ constraint. A maximum epi thickness constraint of 4 mm is imposed by Curve F, and the $d_{max}$ constraint of Equation (13) is given by Curve G. The design is dominated by the tradeoff between $C_{min}$ and $V_{pmin}$. The feasible design region is the shadowed area of the plot. Point P illustrates the optimum device dimensions.

For the chosen design objectives, the optimum device has a diaphragm of $173 \times 173$ μm$^2$ and a thickness of 3.2 μm. The electrode spacing is 0.24 mm yielding a device capacitance of 1.1 Pf and a pull-in voltage of 12 V. The chip including pads and matched reference capacitor occupies an area of 0.17 mm$^2$. Higher yields can be obtained if a smaller admissible pull-in voltage is permitted in the calculation. This large number of devices yielded from a wafer of given size is almost two orders of magnitude higher than that attainable with bulk micromachined designs, and costs are reduced accordingly.

Fabrication Process

A fabrication process in accordance with the present invention is illustrated generally in FIG. 4. The process begins with an SOI wafer having a semiconductor substrate 30, preferably of silicon, an intermediate layer 31 of silicon dioxide or other similar sacrificial material, and a top layer 20a of silicon having a (100) lattice orientation. The alignment key lithography is performed and the SOI silicon is etched in a SF$_6$: C$_2$ClF$_5$ reactor down to the oxide 31 in selected areas but leaving a thin silicon layer 20a. The exposed oxide 31 then is etched in 5:1 BHF. The photoresist is stripped and the samples are piranha cleaned.

Figure 4A:
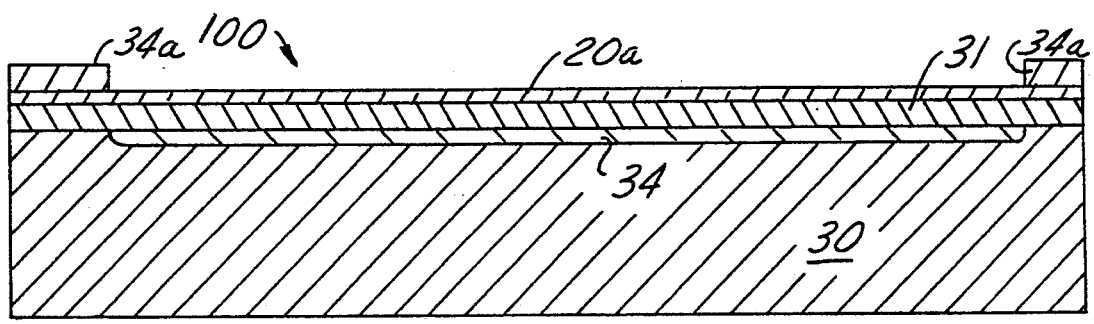
FIG. 4, including views (A) through (L), illustrates cross-sectioned views of the capacitive sensors formed on the SOI wafer at various steps in the manufacturing process.
Figure 4B:
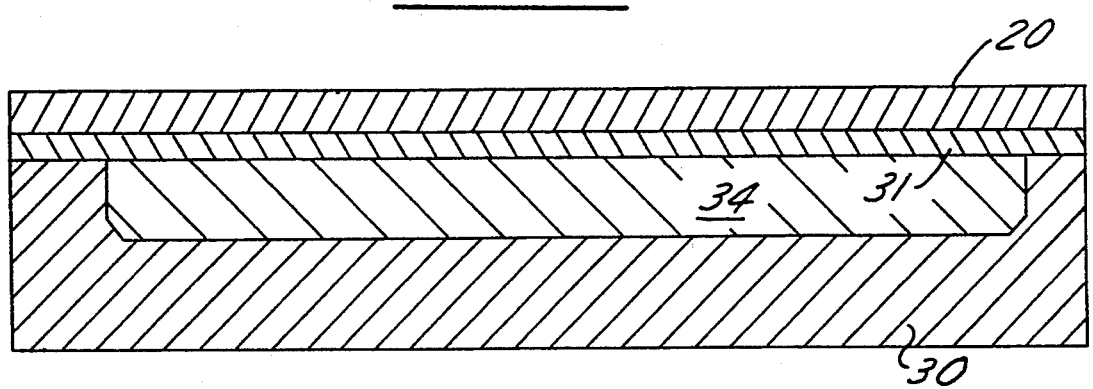
Figure 4C:
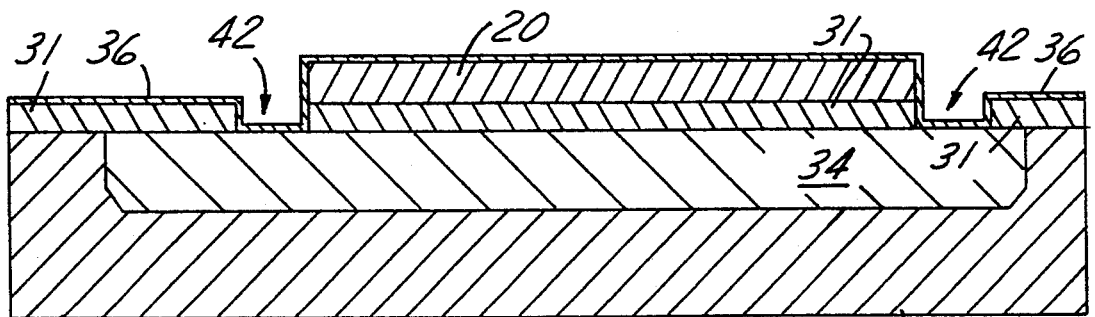
Figure 4D:
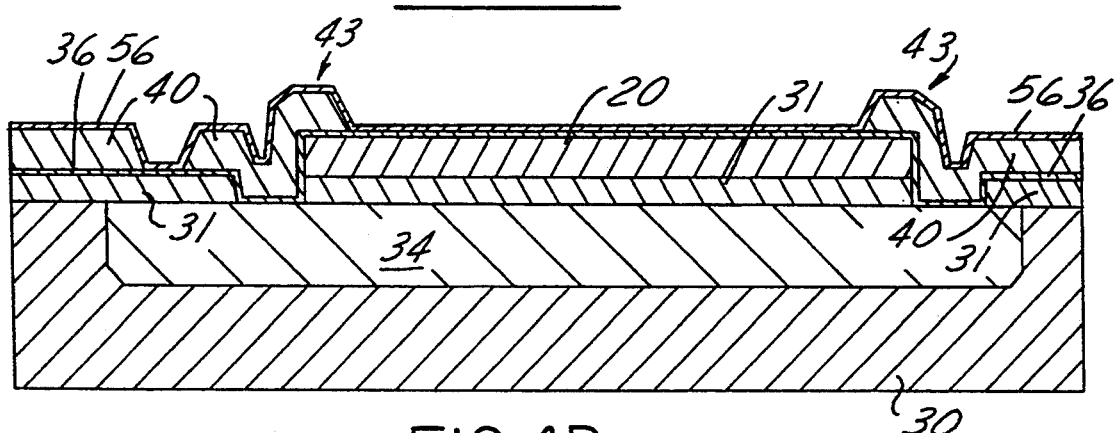
Figure 4E:
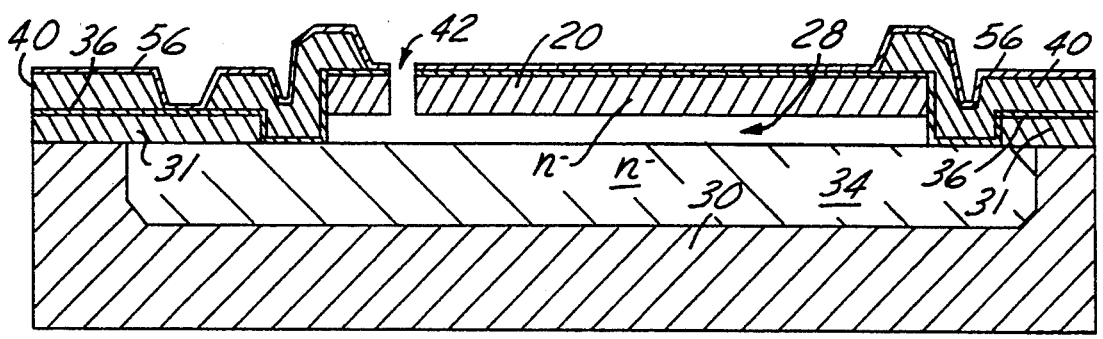

The well lithography then is performed using a photoresist mask (not illustrated). The wafer is implanted with phosphorous on the exposed regions to form the well 34 illustrated in FIG. 4A. After stripping the resist, the wafer is cleaned and given a short anneal to recrystallize the implanted SOI silicon. Next, epitaxial silicon 20 is grown on the residual silicon 20a from the SOI wafer to attain the desired diaphragm thickness for the preferred embodiment as shown in FIG. 4(B). The additional silicon forms in a continuous lattice with the top layer of SOI silicon in order to form a diaphragm having high strength and known resistance to deformation. The diaphragm is lithographically defined and etched in a plasma SF$_6$: C$_2$ClF$_5$ reactor down to the buried oxide 31. The photoresist is removed and the buried oxide is patterned. The oxide 31 then is etched in 5:1 BHF in the exposed regions creating anchor areas 42. The wafer then is cleaned in a piranha (H$_2$SO$_4$: H$_2$O$_2$) solution and a thin 100 nm layer 36 of low-stress SiN is deposited over the entire surface yielding the structure of FIG. 4(C).

A 2 μm layer 40 of LTO that forms the passivation of the transducer then is deposited. The oxide 40 fills the anchor areas 42 and overlaps and attaches to the exposed peripheral areas of the diaphragm 20 for forming diaphragm anchors 43. The LTO 40 seals the periphery of the diaphragm 20 against the substrate 30, and attaches to the top surface of the diaphragm 20 firmly enough to support the diaphragm when the sacrificial oxide 31 is removed later when forming a diaphragm cavity. The LTO 40 is patterned and etched with 5:1 BHF from the general area of the diaphragm 20. Next, the samples are cleaned and a second layer of nitride 56 is deposited, yielding the structure of FIG. 4(D).

A thin 200 nm layer of LTO is deposited on the wafer to be used as a mask for the nitride removal. The LTO is patterned in 5:1 BHF, the photoresist is removed, and the nitride is wet etched in a hot H$_3$PO$_4$ bath. The epitaxial silicon 20 then is wet etched in a 3:33:64 NH$_4$F: H$_2$O: HNO$_3$ solution down to the interelectrode oxide 31 for forming a sacrificial etch hole 42. The wafer is cleaned in piranha and then immersed in a concentrated HF wet etching solution until all the sacrificial interelectrode oxide 31 is removed, thereby forming a diaphragm cavity 28. The diaphragm cavity 28 has a thickness dimension substantially the same as the thickness dimension of the sacrificial oxide layer 31 on the original SOI wafer, which can range from about 0.2 to 1.0 micrometers. After rinsing in a wet solution and cleaning in piranha, the samples undergo a freeze-dry process to solidify any residual liquids within the diaphragm cavity 28. The solids within the diaphragm cavity 28 are then removed by sublimation in order to prevent the deflection by capillary action of the diaphragm 20 which would result if liquids were removed by evaporation. This process yields the structure of FIG. 4(E).

Figure 4F:
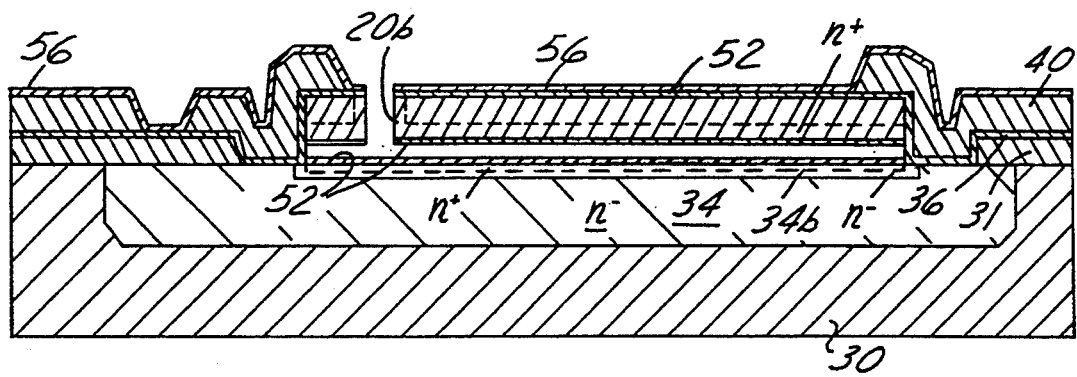
Figure 4G:
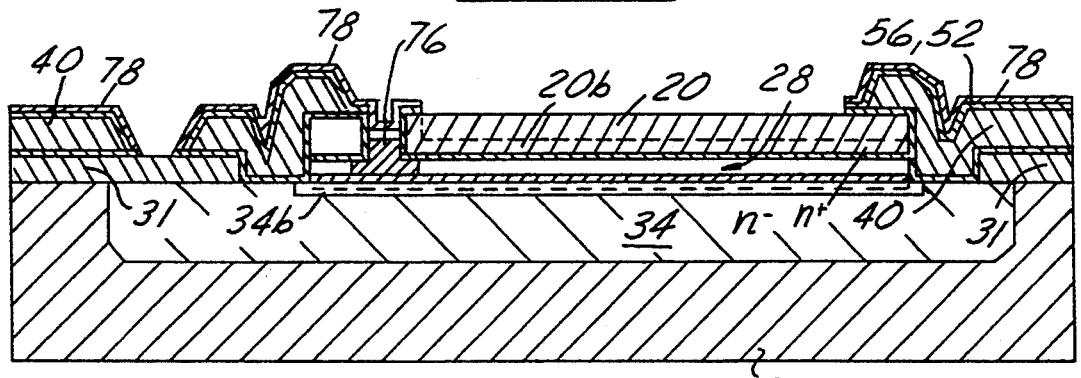

The wafer is then placed in a diffusion furnace and an n+ layer is diffused at a temperature of 950° C. for one hour into the surfaces forming the diaphragm cavity 28, including the upper substrate surface 34b and the lower surface 20b of the diaphragm 20, thereby forming the two spaced, diffused conductive electrode elements 34b and 20b of the sensing capacitor. These electrodes are well defined and capable of tight manufacturing tolerances because of the inherent nature of the diffusion process. The wafer is then piranha cleaned and etched in 10:1 HF to remove any remaining oxide. Then, the wafer is freeze-dried and oxidized in dry oxygen to form about 10 nm of oxide. A 10 nm layer of low-stress LPCVD nitride 52 is grown on the wafer. This nitride layer 52 coats the inside of the diaphragm cavity 28 thereby insulating from a possible electrical shorting of the sensor electrodes. The resulting structure is shown in FIG. 4(F).

Figure 4H:
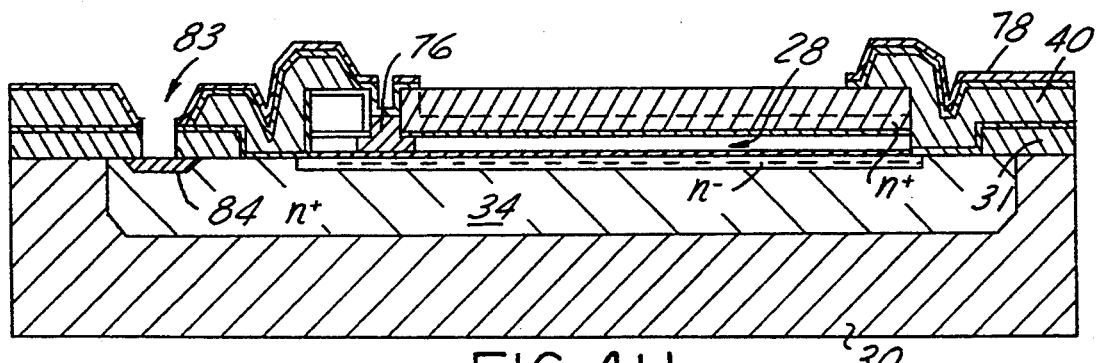
Figure 4I:
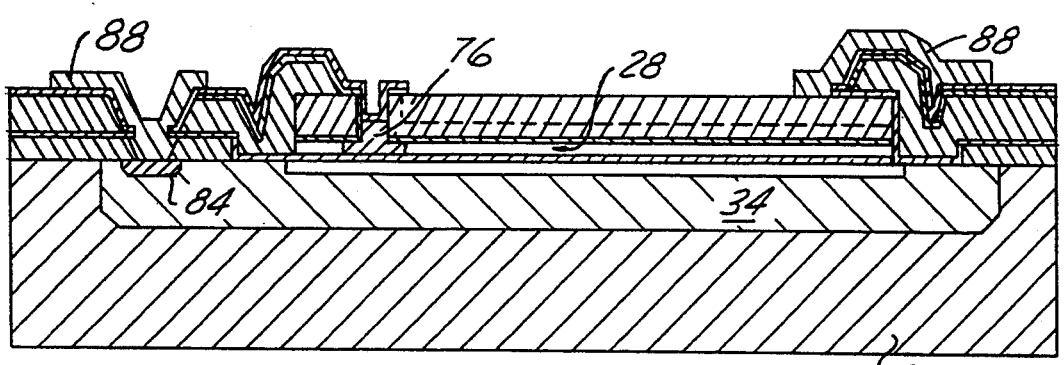

The wafer then is placed in a PECVD $SiO_2$ reactor, and a $0.5\mu$ layer 76 of oxide is deposited on the wafer. The PECVD oxide 76 seals the etch hole 42 without coating the inside of the diaphragm cavity 28. The PECVD oxide is patterned and etched with 5:1 BHF. The wafer is cleaned in piranha, and 100 nm of low-stress nitride 78 is deposited on the wafer. A thin 200 nm layer of LTO then is deposited on the wafer. Next, the contact hole lithography is performed. The LTO is etched in 5:1 BHF. The photoresist is removed and the wafer is cleaned in piranha. After a short 25:1 HF dip and rinse, the wafer is immersed in a hot $H_3PO_4$ bath to remove the underlying nitride 78. The LTO is removed in 5:1 BHF resulting in the contact hole 83 and the general structure of FIG. 4(G). The wafer is immersed in the 5:1 BHF for two more minutes to remove the buried oxide of the contact hole. Next, a high dose of phosphorous is ion implanted on the samples to form the contact diffusion 84 as shown in FIG. 4(H).

The wafer then is given a short anneal to activate the implant dopants. After a short 25:1 HF dip, the metal lithography is performed leaving a layer of AlSi which is etched with aluminum etchant yielding the AlSi pads 88 and the general structure of FIG. 4(I). After removing the resist in acetone, the wafer is sintered at 400° C. for 30 minutes in a forming gas environment.

Figure 4J:
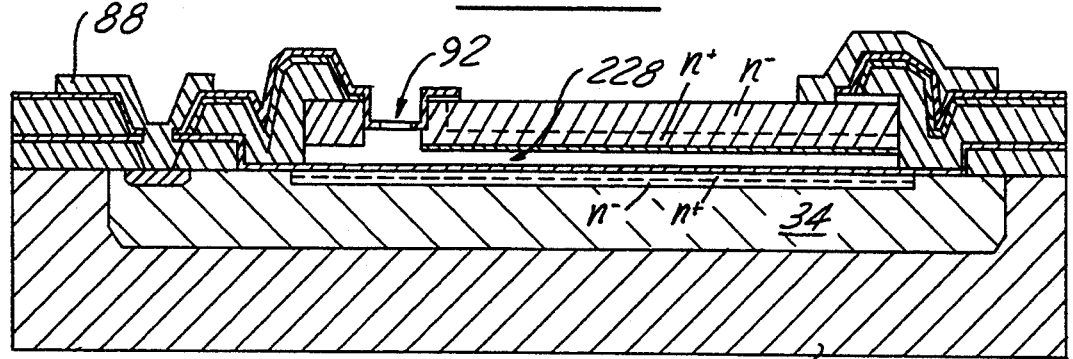
Figure 4K:
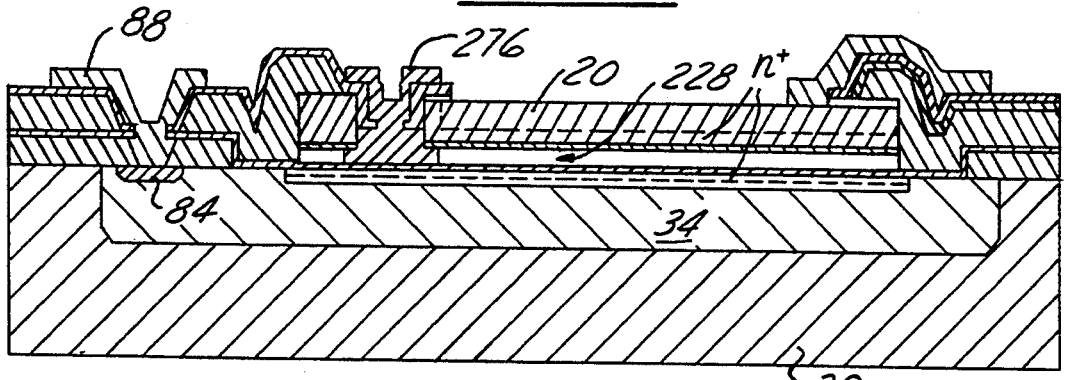

Until this step in the process, all of the sensors on the wafer have been processed together. Now, adjacent pairs of sensors on the same wafer are identified and one is designated as a sensing capacitive element 100 and the other is identified as a reference capacitive element 200. A vent hole 92 is opened in the reference capacitor 200. First, the vent hole lithography is performed and the nitride is etched down to the PECVD oxide with an $SF_6$ plasma. The PECVD oxide 76 of the seal then is removed with 5:1 BHF. After removing the photoresist in acetone and rinsing, the wafer is freeze-dried as shown in FIG. 4(J).

A thin layer of gas permeable polyimide then is spun on the wafer to seal the access hole 92 of the reference capacitive sensor 200 while allowing it to breathe. This process forms a breathable diaphragm cavity 228 in the reference capacitor 200 as compared to a fully sealed diaphragm cavity 28 in the sensing capacitor 100. After softfake, a layer of photoresist is spun on the wafers. Next, the polyimide lithography is performed. The photoresist developer deposited on the wafer attacks the polyimide. The photoresist then is removed with acetone leaving the polyimide seal 276 remaining in the access hole 92. The polyimide then is cured at 300° C. for one hour, yielding the structure shown in FIG. 4(K).

Figure 4L:
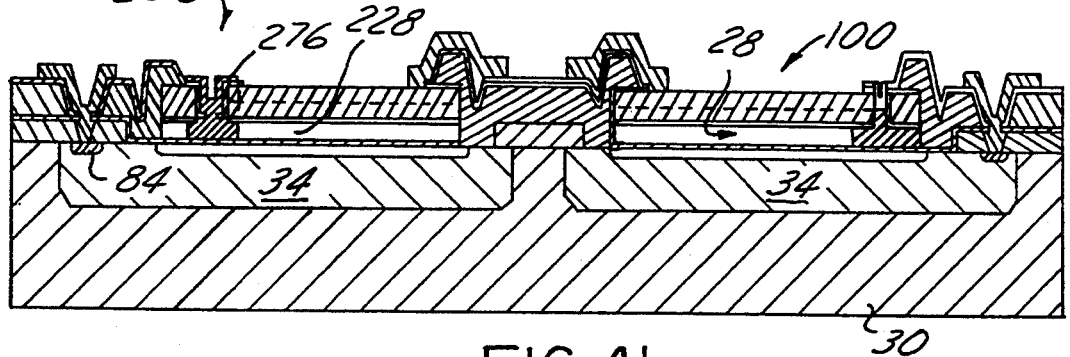

Each adjacent pair of capacitive sensor 100 and reference sensor 200 elements on the wafer is then diced and bonded, resulting in the finished transducer illustrated in FIG. 4(L). The variable capacitive sensor and the reference capacitive sensor may be used for independent and/or ratiometric measurements of changes in absolute pressures with respect to the pressure sealed within the sealed diaphragm cavity. Since the reference transducer is manufactured during the same process as the sealed pressure transducer, the device dimensions and electrical characteristics of the two transducers should be the same.

The SOI manufacturing process includes many features found in MOSFET manufacturing processes. The implementation of a full transducer plus associated CMOS circuits requires only a few (10–20) additional steps in this compatible process.

It will be apparent that many modifications and variations on the method and construction for the transducers may be implemented without departing from the scope of the novel concept of this invention. Therefore, it is intended by the appended claims to cover all such modifications and variations which fall within the true spirit and scope of the invention.

I claim:

1. An absolute pressure capacitive sensor comprising:
   a substrate base of semiconductor material including a first well and a diffused conductive area defined therein for functioning as a first electrode,
   a flexible diaphragm comprising a single crystal silicon layer grown on a sacrificial layer of predetermined thickness over said base so as to be generally contiguous with said first electrode, said diaphragm including a flexible diffused conductive area therein for cooperating as a second electrode with said first electrode for forming therebetween a capacitor having a capacitance variable responsive to the relative displacement of said diaphragm,
   an electrically insulative support, coupled to said base and said diaphragm, for positioning and sealing a peripheral section of said diaphragm above said base by said predetermined thickness after said sacrificial layer is removed for forming a sealed diaphragm cavity therebetween,
   a bore communicating through said diaphragm and into said diaphragm cavity, and
   a plug for being coupled within said bore so as to seal said diaphragm cavity such that a predetermined pressurized stress is induced on said diaphragm by the pressure within said diaphragm cavity, whereby a change in the ambient pressure will cause a deflection of said diaphragm and a corresponding change in the capacitance defined between said first and second electrodes.

2. The capacitive sensor as described in claim 1 wherein said plug further includes $SiO_2$, deposited by a PECVD process, as a sealant for said diaphragm cavity.

3. The capacitive sensor as described in claim 1 wherein said first conductive area and said first flexible conductive area comprise conductive dopant materials diffused into juxtaposed surfaces of said first well in said substrate and said flexible diaphragm which define said diaphragm cavity therein.

4. The capacitive sensor as described in claim 1 further including an electrically insulative layer deposited onto surfaces of said first and second electrodes, thereby preventing an electrical short in the event of a deflection of said diaphragm causing contact with said base.

5. The capacitive sensor as described in claim 3 wherein said sacrificial layer of predetermined thickness comprises an oxide of silicon in a Silicon On Insulator (SOI) wafer.

6. The capacitive sensor as described in claim 5 wherein said predetermined thickness ranges from between 0.5 and 1.0 micrometers.

7. The capacitive sensor as described in claim 1 further including a corresponding, paired reference capacitive sensor comprising:
a reference conductive area diffused within a second well in said substrate base for forming a reference electrode spaced from but generally adjacent to said first conductive area,
a second flexible diaphragm comprising a single crystal silicon layer grown on said sacrificial layer of predetermined thickness over said base so as to be generally contiguous with said reference conductive area, said second diaphragm including a second flexible diffused conductive area therein for cooperating with said reference electrode for forming therebetween a reference capacitor having a capacitance that does not change responsive to a change in the ambient pressure,
a second electrically insulative support, coupled to said base and said second diaphragm, for positioning and sealing a peripheral section of said second diaphragm above said base by said predetermined thickness after said sacrificial layer is removed for forming a second sealed diaphragm cavity therebetween,
a second bore communicating through said second diaphragm and into said second diaphragm cavity, and
a second plug for being coupled within said second bore so as to screen said second bore from the passage of solids therethrough while allowing said second diaphragm cavity to breathe, whereby the reference capacitor will provide a standard capacitance independent of ambient pressure changes.

8. The capacitive sensor as described in claim 7 wherein said reference conductive area and said second flexible conductive area comprise diffused electrodes including conductive dopant materials therein.

9. The capacitive sensor as described in claim 8 wherein said reference conductive area, said second flexible diaphragm, said second flexible conductive area, and said second diaphragm cavity have physical constructions that are generally identical with corresponding elements including said first conductive area, said first flexible diaphragm, said first flexible conductive area, and said first diaphragm cavity.

10. An absolute pressure capacitive sensor comprising:
a substrate base of semiconductor material including a first well and a diffused planar conductive area defined therein for functioning as a first electrode,
a flexible diaphragm comprising a single crystal silicon layer grown on a sacrificial layer of predetermined thickness over said base so as to be generally contiguous and juxtaposed with said first electrode, said diaphragm including a flexible diffused planar conductive area therein for cooperating as a second electrode with said first electrode for forming therebetween a capacitor having a capacitance that varies responsive to the relative displacement of said diaphragm,
an electrically insulative support, coupled between said base and said diaphragm, for supporting and sealing a peripheral section of said diaphragm above said base by a distance equal to said predetermined thickness after said sacrificial layer is removed for forming a sealed diaphragm cavity therebetween, and for maintaining said first electrode generally parallel to said second electrode,
a bore communicating through said diaphragm and into said diaphragm cavity, and
a plug coupled within said bore so as to seal said diaphragm cavity such that a predetermined pressurized stress is induced on said diaphragm by the pressure within said diaphragm cavity, whereby a change in the ambient pressure will cause a deflection of said diaphragm and a corresponding change in the capacitance defined between said first and second electrodes.

11. The capacitive sensor as described in claim 10 further including an electrically insulative layer deposited onto surfaces of said first and second electrodes, thereby preventing an electrical short in the event of a deflection of said diaphragm causing contact with said base.

12. The capacitive sensor as described in claim 10 further including a corresponding paired reference capacitive sensor comprising:
a second well in said substrate base having a reference conductive area diffused therein for forming a reference electrode spaced from but generally adjacent to said first conductive area,
a second flexible diaphragm comprising a single crystal silicon layer grown on said sacrificial layer of predetermined thickness over said base so as to be generally contiguous and juxtaposed with said reference conductive area, said second diaphragm including a second flexible diffused planar conductive area therein for cooperating with said reference electrode for forming therebetween a reference capacitor having a capacitance that does not vary responsive to a change in the ambient pressure,
a second electrically insulative support, coupled between said base and said second diaphragm, for supporting and sealing a peripheral section of said second diaphragm above said base by said predetermined thickness after said sacrificial layer is removed for forming a second sealed diaphragm cavity therebetween,
a second bore communicating through said second diaphragm and into said second diaphragm cavity, and
a second plug for being coupled within said second bore so as to screen said second bore from the passage of solids therethrough while allowing said second diaphragm cavity to breathe, whereby said reference capacitor will provide a standard capacitance independent of ambient pressure changes.

13. The capacitive sensor as described in claim 12 wherein said reference conductive area, said second flexible diaphragm, said second flexible conductive area, and said second diaphragm cavity are generally identical with corresponding elements including said first conductive area, said first flexible diaphragm, said first flexible conductive area, and said first diaphragm cavity.

14. Absolute pressure and reference capacitive sensors comprising:
a substrate base of semiconductor material including a first well and a diffused planar conductive area defined therein for functioning as a first electrode,
a flexible diaphragm comprising a single crystal silicon layer grown on a sacrificial layer of predetermined thickness over said base so as to be generally contiguous and juxtaposed with said first electrode, said diaphragm including a flexible diffused planar conductive area therein for cooperating as a second electrode with said first electrode for forming therebetween an absolute pressure capacitor having a capacitance that varies responsive to the relative displacement of said diaphragm, an electrically insulative support, coupled between said base and said diaphragm, for supporting and sealing a peripheral section of said diaphragm above said base by a distance equal to said predetermined thickness after said sacrificial layer is removed for forming a sealed diaphragm cavity therebetween and for maintaining said first electrode generally parallel to such second electrode, a bore communicating through said diaphragm and into said diaphragm cavity, a plug deposited within said bore so as to seal said diaphragm cavity such that a predetermined pressurized stress is induced on said diaphragm by the pressure within said diaphragm cavity, whereby a change in the ambient pressure will cause a deflection of said diaphragm and a corresponding change in the capacitance of said absolute pressure capacitor, a second well in said substrate base having a reference conductive area diffused therein for forming a reference electrode spaced from but generally adjacent to said first conductive area, a second flexible diaphragm comprising a single crystal silicon layer grown on said sacrificial layer of predetermined thickness over said base so as to be generally contiguous and juxtaposed with said reference conductive area, said second diaphragm including a second flexible diffused planar conductive area therein for cooperating with said reference electrode for forming therebetween a reference capacitor having a capacitance that does not vary responsive to a change in the ambient pressure, a second electrically insulative support, coupled between said base and said second diaphragm, for supporting and sealing a peripheral section of said second diaphragm above said base by said predetermined thickness after said sacrificial layer is removed for forming a second sealed diaphragm cavity therebetween, a second bore communicating through said second diaphragm and into said second diaphragm cavity, and a second plug for being coupled within said second bore so as to screen said second bore from the passage of solids therethrough while allowing said second diaphragm cavity to breathe, whereby said reference capacitor will provide a standard capacitance independent of the pressure changes causing a change in capacitance in said absolute pressure capacitor.

15. The capacitive sensor as described in claim 14 wherein said reference conductive area, said second flexible diaphragm, said second flexible conductive area, and said second diaphragm cavity are generally identical with corresponding elements including said first conductive area, said first flexible diaphragm, said first flexible conductive area, and said first diaphragm cavity.

16. The capacitor sensor as described in claim 14, wherein said flexible diaphragm and said second flexible diaphragm are coplanar after being etched from a common single crystal silicon layer on a silicon on insulator substrate.

* * * * *